Aug. 29, 1967 L. A. SCHLABACH ETAL 3,339,095
SPEED INDICATING DYNAMOELECTRIC MACHINE AND
TACHOMETER GENERATOR STRUCTURE THEREFOR
Filed Oct. 28, 1964 2 Sheets-Sheet 1

INVENTORS
Leland A. Schlabach
& George R. Loos
BY
ATTORNEY

United States Patent Office 3,339,095
Patented Aug. 29, 1967

3,339,095
SPEED INDICATING DYNAMOELECTRIC MACHINE AND TACHOMETER GENERATOR STRUCTURE THEREFOR
Leland A. Schlabach, Wilkins Township, Pittsburgh, and George R. Loos, Pittsburgh, Pa., assignors to Westinghouse Electric Corporation, Pittsburgh, Pa., a corporation of Pennsylvania
Filed Oct. 28, 1964, Ser. No. 407,168
10 Claims. (Cl. 310—66)

The present invention relates to dynamoelectric machines and more particularly to dynamoelectric machines in which AC tachometer generator structure is disposed to provide a speed indicating signal voltage for machine speed control or other purposes.

In many dynamoelectric machine applications it is desirable to utilize an AC tachometer for generating a speed indicating voltage. Commonly, a separate AC tachometer coupled to the machine shaft is employed for this purpose. However, it is often desirable that a machine and speed indicating tachometer be arranged together as a single speed indicating machine unit so as to provide improved utility through better overall space utilization and in some instances through better tachometer response. The integrated unit can also provide improved manufacturing economy through simpler construction employing standard mass production machine parts. When so combined as well as when separately used, a tachometer desirably is arranged to produce an output signal having ample magnitude substantially proportional to the rotor speed.

In accordance with the principles of the present invention, a speed indicating dynamoelectric machine comprises a main stator core disposed within a frame and between a pair of end plates which in turn support a rotor shaft having a main rotor thereon. An AC tachometer generator rotor is disposed on the shaft in proximity to the inner side of one of the end plates and a tachometer stator is mounted inwardly of the same end plate and about the tachometer rotor. A permanent magnet is associated with the tachometer stator and it alternately feeds the main component of its flux through the tachometer rotor and through an output stator coil leg as teeth on the rotor pass beneath opposed tachometer stator pole faces.

It is therefore an object of the invention to provide a novel dynamoelectric machine or single phase motor in which an AC tachometer generator is incorporated to provide manufacturing economy.

A further object of the invention is to provide a novel dynamoelectric machine or single phase motor in which an AC tachometer generator is incorporated to provide better utility through improved overall space utilization.

Another object of the invention is to provide a novel dynamoelectric machine or single phase motor wherein an AC tachometer generator is incorporated to provide a relatively high magnitude output voltage proportional to machine speed without requiring a design change in standard machine or motor parts.

An additional object of the invention is to provide a novel tachometer generator characterized with manufacturing economy yet being operable to provide a relatively high magnitude output voltage substantially proportional to the speed of the tachometer rotor.

These and other objects of the invention will become more apparent upon consideration of the following detailed description along with the attached drawings, in which.

Figure 1:
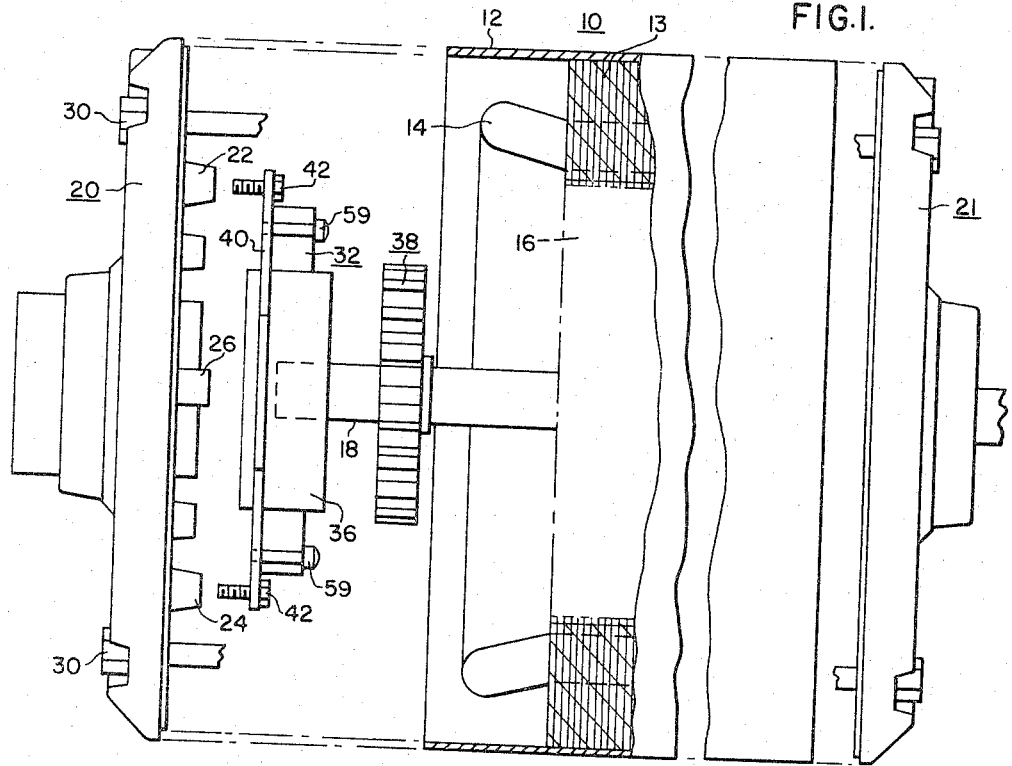
FIGURE 1 is a front view of portions of a dynamoelectric machine or single phase motor constructed in accordance with the principles of the invention and having the parts thereof in exploded relation.

More specifically, there is shown in FIG. 1 a speed indicating dynamoelectric machine 10 constructed in accordance with the principles of the invention in the form of a single phase capacitor or capacitor start motor. The motor 10 includes a conventional frame 12 within which there is disposed a stator core 13 having winding means with end turns 14. A rotor core 16 is supported by means of a shaft 18 within the stator core 13 between an end plate 20 and another similar end plate 21. The rotor shaft 18 extends through an opening 23 in each end plate and is supported therein by suitable bearing means (not shown).

The end plate 20 is standardly employed in conventional single phase capacitor start motor units and is provided with various structural features adapted for ventilating and other purposes. In particular, the end plate 20 includes three bosses 22, 24 and 26 located about a conduit box opening 28 and normally employed for supporting a centrifugal switch. To tie the entire motor 10 in assembled relation, a plurality of through bolts 30 can be extended through the end plate 20 and the stator core 13 of the motor 10 for securance to the other end plate 21.

As previously described, there are numerous applications where it is desirable to provide a speed indication of a dynamoelectric machine or motor. For example, the motor 10 in this case is intended for driving the agitator and drum of a center post agitator washing machine, and in such use it is desirable to provide controlled motor speed which requires a feedback parameter proportional to speed, as set forth in a copending application Ser. No. 604,981, entitled "Speed Control System for Single Phase Capacitor Motor" filed on Oct. 28, 1964 by L. Schlabach and assigned to the present assignee.

The required feedback parameter is conveniently provided by a tachometer generated AC voltage if the tachometer voltage has adequate magnitude and provides speed indicating accuracy for the intended control purposes. To optimize manufacturing economy and user utility, the tachometer is preferably incorporated in the motor structure without any requirement for changing the design of parts normally employed in conventional mass production machine units.

Figure 3:
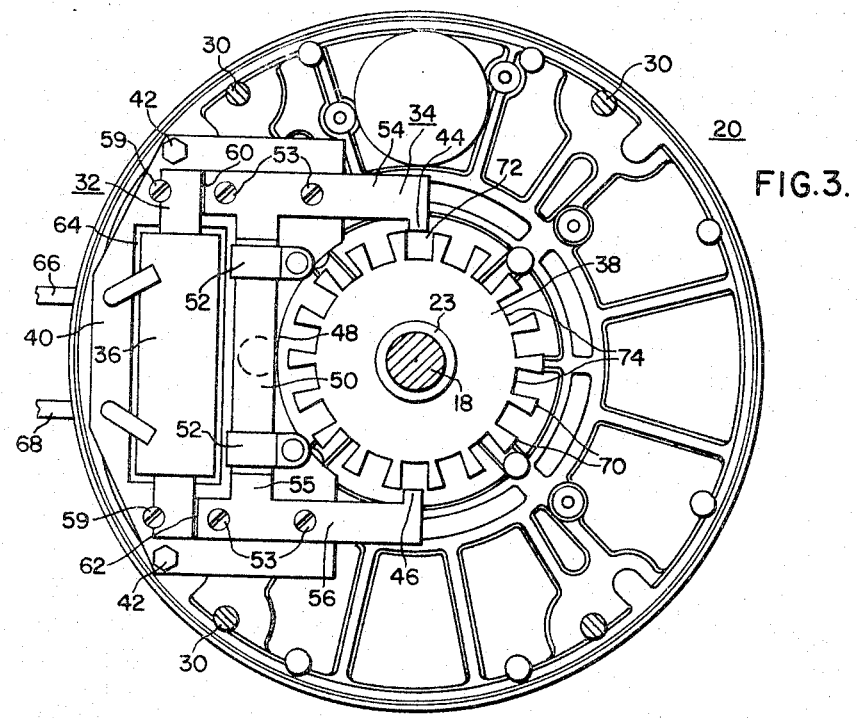
FIG. 3 is a view similar to FIG. 2 with a tachometer stator and rotor shown in assembled relation with the machine end plate.

Within this framework of end objects, the speed indicating motor 10 includes tachometer structure 32 (FIG. 3) including a stator 34 having output coil means 36 and a thin disc-like rotor 38 preferably secured in non-magnetic relation on the motor shaft 18 by suitable means. If the shaft 18 is formed from non-magnetic material, then the rotor 38 can be directly disposed thereon with good magnetic isolation from the motor.

The tachometer rotor 38 and stator 34 are arranged to fit within the space normally disposed between the motor end plate 20 and the motor rotor 16 and stator 13 in conventional motor units while being operable to produce a coil output voltage having relatively high magnitude substantially proportional to motor speed. In this case, the normally provided space exists in conventional production units for the purpose of accommodating a centrifugal starting switch (not shown) which disconnects the starting winding from the motor circuit after the conventional motor reaches a predetermined minimum speed.

To fit within the available space, the tachometer rotor 38 and stator 34 are provided with relatively small size and in particular a relatively small thickness. For example, in a sample device constructed in accordance with the illustrated embodiment, the end plate 20 had a diameter of approximately 6.4 inches while the tachometer rotor 38 had a diameter of approximately 2.4 inches and a thickness of approximately 0.38 inch, and the tachometer stator iron generally had a cross section of approximately 0.38 inch by 0.38 inch.

A mounting board 40 preferably of suitable nonmagnetic material is employed for supporting and magnetically isolating the tachometer stator 34 inwardly of the motor end pate 20 and in particular is seated on the end plate bosses 22, 24 and 26. Securance of the mounting board 40 to the end plate 20 can be provided by suitable bolts 42 extended through openings in the mounting board 40 into engagement with threaded openings in the bosses 22 and 24.

To provide for tachometer rotor placement and rotation between stator pole faces 44 and 46, the mounting board 40 preferably is provided with an arcuate cutout 48. For space conservation, the board 40 is preferably flat and relatively thin with its solid plane generally parallel and adjacent to the solid plane which substantially encompasses the tachometer stator 34.

The stator 34 includes an elongated, preferably rod-like permanent magnet 50 secured to the mounting board 40 by suitable clamp and bolt means 52 and further includes opposed generally T-shaped legs 54 and 56 suitably secured to the board 40 by bolts 53 or the like. The stator legs 54 and 56 provide a flux loop path through the pole faces 44 and 46 to the rotor 38 from the permanent magnet 50 which is end butted against portions 55 and 57. Another stator flux loop path is provided from the magnet 50 through elongated and preferably straight coil leg 58 and gaps 60 and 62 which are disposed between the stator legs 54 and 56 and the coil leg 58 outside the rotor flux loop path. The gaps 60 and 62 preferably are maintained by suitable spacers disposed therein, even though the coil leg 58 is also secured to the mounting board 40 by bolts 59 or the like.

To form the coil means 36, a single winding of an insulated conductor is wound with a plurality of turns about the coil leg 58 and disposed in an opening 64 in the mounting board 40. Bulkiness of the coil 36 is avoided to meet the overall space limitations. For example, in the previously referenced sample device the coil 36 had 4,000 turns of fine wire which resulted in cross section dimensions of approximately .75 inch by .75 inch. If desired, leads 66 and 68 from the coil 36 are suitably extended through the mounting board 40 for external connection.

The tachometer rotor 38 includes a plurality of circumferentially spaced teeth 70 which form a gap 72 with the stator pole face 44 or 46 when in confronting relation therewith. When rotor slots 74 confront the pole face 44 or 46, a larger effective gap or higher reluctance gap exists. The number of teeth 70 determines the tachometer voltage output frequency, and in some cases as in the exemplary washing machine control application such frequency is desirably relatively high. In this embodiment, the tachometer rotor 38 is provided with 18 teeth to provide an output voltage frequency of 540 cycles per second for a motor speed of 1800 r.p.m.

Figure 4:
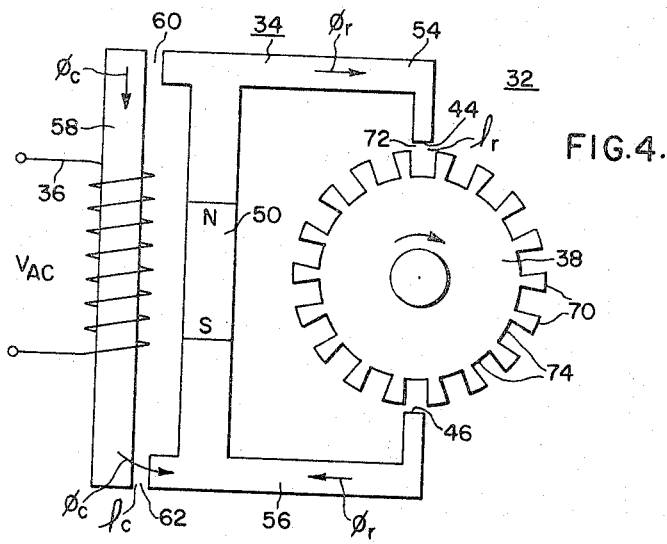
FIG. 4 is a schematic view used to illustrate the electromagnetic theory according to which the tachometer operates.
Figure 2:
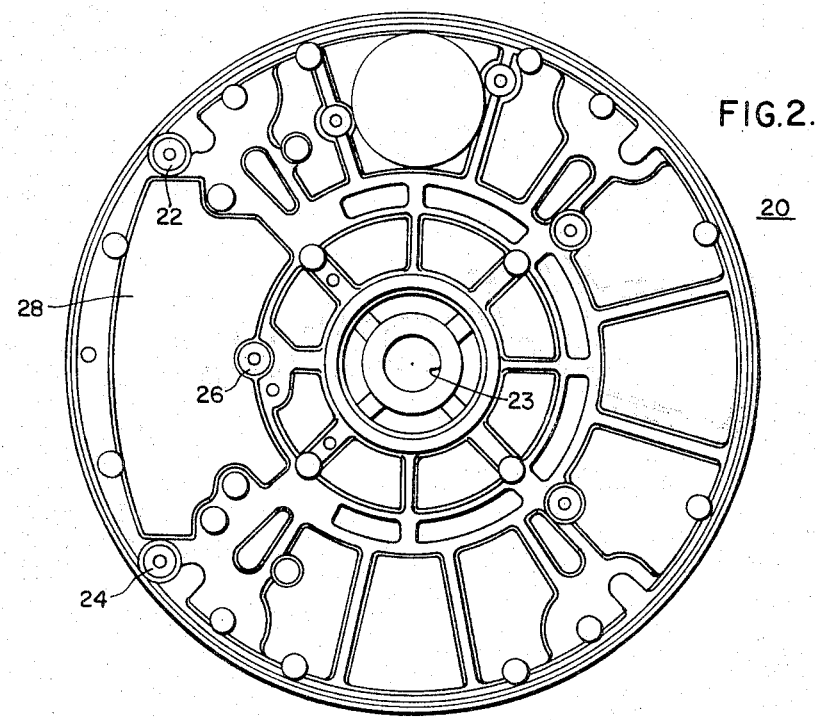
FIG. 2 is a plan view showing the inner side of an end plate employed in the machine of FIG. 1.

As schematically illustrated in FIG. 4, each coil leg gap 60 or 62 is provided with a reluctance greater than the reluctance of the stator rotor air gap 72, preferably by means of a length $l_c$ (say 8 mils) greater than length $l_r$ (say 5 mils). Further, the effective reluctance or preferably effective length of the air gap 72 when the slots 74 confront the pole faces 44 and 46 is greater than the coil leg reluctance or gap length $l_c$.

The electromagnetic operation of the tachometer 32 is thus largely explained on the basis of variable reluctance theory. Magnetomotive force of the stator magnet 50 produces relatively large flux $\phi_r$ through the relatively low reluctance rotor loop path provided through gaps 72 when the rotor teeth 70 are aligned with the stator pole faces 44 and 46. Since the coil gap length $l_c$ is greater than the rotor gap length $l_r$, relatively little flux $\phi_c$ is generated in the coil leg 58 under these circumstances.

When the rotor slots 74 are aligned with the pole faces 44 and 46, a relatively high reluctance exists in the rotor loop path, and the magnetomotive force of the stator magnet 50 directs relatively little flux $\phi_r$ through the rotor 38 and relatively high flux $\phi_c$ through the coil leg gaps 60 and 62 and the coil leg 58. The flux $\phi_c$ thus fluctuates between relatively low and high values as the rotor teeth 70 successively rotate across the stator pole faces 44 and 46. As a result, the magnitude and frequency of voltage generated in the coil 36 are substantially proportional to the speed of the tachometer rotor 38 and hence the speed of the motor 10. The gap reluctances or lengths $l_r$ and $l_c$ and the effective rotor slot gap reluctance or length can be adjusted within the limits prescribed to obtain relatively wide swings in the flux and accordingly provide a basis for relatively high voltage generation in the coil 36.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A speed indicating dynamoelectric machine comprising a frame, a main stator supported by said frame, a main rotor mounted within said stator on a shaft, a pair of end plates supporting said shaft and fixedly secured in relation to said frame, a tachometer rotor supported on said shaft axially between one of said end plates and said main rotor and stator and having a relatively small thickness in the axial direction of said shaft, said tachometer rotor having a plurality of circumferentially disposed teeth separated by respective slots, tachometer stator core means suitably supported between and substantially magnetically isolated from said one end plate and said main rotor and stator, said tachometer stator core means also having a relatively small thickness in the axial direction of said shaft and having at least a pair of opposed pole faces between which said rotor is disposed for rotation with said rotor teeth forming a rotor gap therewith and said rotor slots forming an effective slot gap therewith, a permanent magnet physically disposed for magnetic connection within said tachometer stator core means in a flux loop path including said rotor through said pole faces, a coil leg having output coil means disposed thereon magnetically connected in another flux loop path including said permanent magnet, gap means disposed in said other loop path between said coil leg and said magnet and outside said rotor flux loop path, said coil leg gap means having a magnetic reluctance greater than that of said rotor gap and less than that of said effective slot gap.

2. A speed indicating single phase motor comprising a frame, a main stator supported by said frame, a main rotor mounted within said stator on a shaft, a pair of end plates supporting said shaft and fixedly secured in relation to said frame, a tachometer rotor supported on said shaft axially between one of said end plates and said main rotor and stator and having a relatively small thickness in the axial direction of said shaft, said tachometer rotor having a plurality of circumferentially disposed teeth separated by respective slots, tachometer stator core means having a relatively small thickness in the axial direction of said shaft and having at least a pair of opposed pole faces between which said rotor is disposed for rotation with said rotor teeth forming a rotor gap therewith and said rotor slots forming an effective slot gap therewith, means for supporting said tachometer stator core means nonmagnetically on one of said end plates, permanent magnet physically disposed for magnetic connection within said tachometer stator core means in a flux loop path including said rotor through said pole faces, a coil leg having output coil means disposed thereon magnetically connected in another flux loop path including said magnet, gap means disposed in said other loop path between said coil leg and said magnet and outside said rotor flux loop path, said coil leg gap means having a magnetic reluctance greater than that of said rotor gap and less than that of said effective slot gap.

3. A speed indicating single phase motor as set forth in claim 2 wherein said coil leg gap means has a length greater than that of said rotor gap and less than that of said effective slot gap.

4. A speed indicating single phase motor as set forth in claim 2 wherein said tachometer stator core mounting means includes a relatively flat mounting board formed from non-magnetic material and secured to said one end plate, and means securing said stator core means including said permanent magnet and said coil leg to said mounting board.

5. A speed indicating single phase motor as set forth in claim 4 wherein a solid reference plane encompassing said mounting board is substantially parallel with a solid reference plane substantially encompassing said tachometer stator core means and wherein a radially inner portion of said mounting board is provided with a cutout to accommodate rotation of said tachometer rotor.

6. A speed indicating single phase motor comprising a frame, a main stator supported by said frame, a main rotor mounted within said stator on a shaft, a pair of end plates supporting said shaft and fixedly secured in relation to said frame, a tachometer rotor supported on said shaft axially between one of said end plates and said main rotor and stator and having relatively small thickness in the axial direction of said shaft, said tachometer rotor having a plurality of circumferentially disposed teeth separated by respective slots, tachometer stator core means suitably supported axially between and substantially magnetically isolated from said one end plate said main rotor and stator, said tachometer stator core means also having a relatively small thickness in the axial direction of said shaft and including a pair of spaced coil legs providing at least a pair of opposed pole faces between which said rotor is disposed for rotation with said rotor teeth forming a rotor gap therewith and said rotor slots forming an effective slot gap therewith, a permanent magnet magnetically connected between said core legs in a flux loop path including said rotor through said pole faces, an elongated coil leg having output coil means disposed thereon magnetically connected in another flux loop path including said magnet, gap means disposed between each of opposite ends of said elongated coil leg and said respective core legs and outside said rotor flux loop path, said coil leg gap means having a length greater than that of said rotor gap and less than that of said effective slot gap.

7. A speed indicating single phase motor comprising a frame, a main stator supported by said frame, a main rotor mounted within said stator on a shaft, a pair of end plates supporting said shaft and fixedly secured in relation to said frame, a tachometer rotor supported on said shaft axially between one of said end plates and said main rotor and stator and having a relatively small thickness in the axial direction of said shaft, said tachometer rotor having a plurality of circumferentially disposed teeth separated by respective slots, tachometer stator core means having a relatively small thickness in the axial direction of said shaft and having at least a pair of opposed pole faces between which said rotor is disposed for rotation with said rotor teeth forming a rotor gap therewith and said rotor slots forming an effective slot gap therewith, means for supporting said tachometer stator core means on one of said end plates, said supporting means including at least a pair of inwardly projecting bosses on said one end plate, a relatively thin mounting board formed from non-magnetic material and secured to said end plate bosses, said stator core means including a pair of spaced core legs secured to said mounting board and providing at least a pair of opposed pole faces between which said rotor is disposed for rotation with said rotor teeth forming a rotor gap therewith and said rotor slots forming an effective slot gap therewith, a permanent magnet secured to said mounting board and magnetically connected between said core legs in a flux loop path including said rotor through said pole faces, an elongated coil leg secured to said mounting board and having output coil means disposed thereon, said leg connected in another flux loop path including said magnet, gap means disposed between each end of said coil leg and the respective core legs and outside said rotor flux loop path, said coil leg gap means having a length greater than that of said rotor gap and less than that of said effective slot gap.

8. A tachometer generator comprising a rotor having a plurality of circumferentially disposed teeth separated by slots, a stator member including a stator core having at least two opposed pole faces and having permanent magnet means for providing magnetic flux, means for supporting the rotor for rotation between said pole faces so that a first flux path is provided for said flux through the stator core and the rotor, the stator member also including a coil leg disposed to provide a second flux path through the stator core and the coil leg, the reluctance of said second flux path being greater than that of the first flux path when the teeth of the rotor are aligned with the pole faces and the reluctance of the second flux path being less than that of the first flux path when the slots of the rotor are aligned with the pole faces, and an output coil disposed on the coil leg of the stator.

9. A tachometer generator as defined in claim 8 in which the coil leg is disposed adjacent the stator core with an air gap therebetween, the length of said air gap being such that it is greater than the total gap between the rotor and the pole faces when the rotor teeth are aligned with the pole faces and less than the total gap between the rotor and the pole faces when the rotor slots are aligned with the pole faces.

10. A tachometer generator is defined in claim 8 in which the stator core comprises two members abutting opposite ends of the permanent magnet means, each of said members having an extension at one side thereof extending toward the rotor and having a pole face thereon, and each of said members having a projection on the opposite side thereof, said coil leg being disposed adjacent said projections and spaced therefrom by an air gap, the length of said air gap being such that it is greater than the total gap between the rotor and the pole faces when the rotor teeth are aligned with the pole faces and less than the total gap between the rotor and the pole faces when the rotor slots are aligned with the pole faces.

References Cited
UNITED STATES PATENTS

| | | | |
|---|---|---|---|
| 2,502,628 | 4/1950 | Maynard | 310—5 |
| 1,561,452 | 11/1952 | Alden | 310—66 |
| 2,911,585 | 11/1959 | Tyson | 324—70 |
| 2,941,120 | 6/1960 | Harman | 317—5 |
| 3,089,061 | 5/1963 | Nieuweboer | 324—70 |
| 3,114,851 | 12/1963 | Santi | 310—190 |

MILTON O. HIRSHFIELD, *Primary Examiner.*

J. D. MILLER, *Assistant Examiner.*